(12) United States Patent
Schoenthal

(10) Patent No.: US 6,910,154 B1
(45) Date of Patent: Jun. 21, 2005

(54) PERSISTENT AND RELIABLE DELIVERY OF EVENT MESSAGES

(75) Inventor: Scott Schoenthal, San Ramon, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 635 days.

(21) Appl. No.: 09/642,064

(22) Filed: Aug. 18, 2000

(51) Int. Cl.⁷ .............................................. G06F 11/00
(52) U.S. Cl. ........................................ 714/18; 714/17
(58) Field of Search ............................. 714/18, 17, 16, 714/15, 4, 12, 48

(56) References Cited

U.S. PATENT DOCUMENTS

| | | | | |
|---|---|---|---|---|
| 4,937,763 | A | | 6/1990 | Mott ........................... 364/550 |
| 5,067,099 | A | | 11/1991 | McCown et al. ........... 364/550 |
| 5,224,095 | A | * | 6/1993 | Woest et al. ................. 370/401 |
| 5,265,229 | A | * | 11/1993 | Sareen ........................ 710/100 |
| 5,423,068 | A | * | 6/1995 | Hecker ........................ 455/438 |
| 6,119,244 | A | * | 9/2000 | Schoenthal et al. ............. 714/4 |
| 6,477,564 | B1 | * | 11/2002 | Freyssinet et al. .......... 709/202 |
| 6,519,712 | B1 | * | 2/2003 | Kim et al. ..................... 714/15 |
| 6,545,981 | B1 | * | 4/2003 | Garcia et al. ............... 370/242 |

FOREIGN PATENT DOCUMENTS

EP 0537098 4/1993

OTHER PUBLICATIONS

Lowell, David E. and Chen, Peter M.; "Persistent Messages in Local Transactions", Jun. 1998; 17ᵗʰ ACM Symposium on Principles of Distributed Computing; Jun. 1998.*

Borg, Anita et al.; "Fault Tolerance Under UNIX"; Feb. 1989; ACM Transactions on Computer Systems, vol 7, No. 1, Feb. 1989, pp. 1–247.*

* cited by examiner

Primary Examiner—Scott Baderman
Assistant Examiner—Joshua Lohn
(74) Attorney, Agent, or Firm—Swernofsky Law Group PC

(57) ABSTRACT

The invention provides a method and system for persistent and reliable delivery of event messages. Those parts of the system responsible for delivering event messages are able to persistently maintain those event messages until the intended recipient of the event message confirms delivery of those event messages. Those parts of the system responsible for recovering from system crashes and other system errors are able to persistently maintain those event messages until delivery, even after recovery from system crashes or other system errors. The system includes a set of event message producers, and maintains an event-indication queue of those event messages provided by the event producers using a set of pre-allocated resources. An event-distribution engine distributes event messages to intended recipients and, after having received confirmation that the event messages were received, removes them from the event-indication queue. Recipients of event messages receive the event messages, acknowledge their receipt thereof, and might take action in response to the event message. The system includes persistent memory, initialization memory, and recipient persistent memories, and provides upon recovery from system crashes or other system error, an ability to replay event messages recorded in those memories, to re-present them as event messages. A cluster of file servers collectively forming a highly-available system shares persistent memories, so that upon a system crash or other system error, at least one other file server has a record of those event messages.

27 Claims, 4 Drawing Sheets

Fig. 2A

*1. Processing Event Messages*

210
The system 100 is ready to receive an event message 111.

211
An event producer 110 generates an event message 111.

212
If the system 100 is in normal operation, the event message 111 is recorded in the pre-allocated initialization event message resources 120. If the system 100 is still in its initialization time duration, the event message 111 is recorded in the pre-allocated post-initialization event message resources 130.

213
The system 100 copies information about the event message 111 to a set of locations in the persistent memory 140.

214
The system 100 copies information about the event message 111 to the event indication queue 150. In a preferred embodiment, the event indication queue 150 includes a FIFO similar to that maintained in the persistent memory 140.

215
The event distribution engine 160 responds to the information about the event message 111 in the event indication queue 150. The event distribution engine 160 delivers the event message 111 to its intended recipients 172.

216
The event distribution engine 160 awaits confirmation from each intended recipient 172 that the event message 111 was received by that particular intended recipient 172. When the event distribution engine 160 receives confirmation from all intended recipients 172, the method proceeds with the next step.

217
The event distribution engine 160 removes the information about the event message 111 from the event indication queue 150 and from the persistent memory 140.

220
The system 100 has completely processed the event message 111.

*2. Replaying Event Messages*

230
The system 100 has recovered from a system crash or a system error.

to Fig 2B

PERSISTENT AND RELIABLE DELIVERY OF EVENT MESSAGES

BACKGROUND OF THE INVENTION

1. Field of the Invention

This invention relates to persistent and reliable delivery of event messages, including event messages in file server systems in which it is desired to maintain reliable file system consistency.

2. Related Art

In systems that provide services to clients, such as those including file servers and similar devices, it often occurs that the system, or some subsystem within that system, generates a message indicating the occurrence of a special event. Typically, the special event is an error of some kind, and the message conveys information regarding the nature of the special event, such as the type of error and the subsystem within which the error occurred. Many systems that provide services, including file servers, make efforts to assure that the services are reliably provided, and that the system providing the services is in a consistent state at all times. Thus, such systems find it advantageous to assure that all state information regarding the system, including state information relating to error messages, is persistently and reliably maintained. Such systems also find it advantageous to assure that all event messages are reliably delivered and persistently maintained until delivery is confirmed by the intended recipient of the event message.

Accordingly, it would be advantageous to provide a technique for persistent and reliable delivery of event messages, that is not subject to the drawbacks of the known art. Preferably, those parts of the system responsible for delivering event messages are able to persistently maintain those event messages until delivery of those event messages has been confirmed by the intended recipient of the event message. Moreover, those parts of the system responsible for recovering from system crashes and other system errors are able to persistently maintain those event messages until delivery, even after recovery from system crashes or other system errors.

SUMMARY OF THE INVENTION

The invention provides a method and system for persistent and reliable delivery of event messages, that is not subject to the drawbacks of the known art. Those parts of the system responsible for delivering event messages are able to persistently maintain those event messages until delivery of those event messages has been confirmed by the intended recipient of the event message. Those parts of the system responsible for recovering from system crashes and other system errors are able to persistently maintain those event messages until delivery, even after recovery from system crashes or other system errors.

In a first aspect of the invention, the system includes a set of event message producers, and maintains an event-indication queue of those event messages provided by the event producers using a set of pre-allocated resources. This first aspect allows the system to maintain the event-indication queue even when the event message indicates that allocation of new resources (such as for recording event messages) is unstable. An event-distribution engine distributes event messages to intended recipients and, after having received confirmation that the event messages were received, removes them from the event-indication queue. Recipients (also called "consumers") of event messages receive the event messages, acknowledge their receipt thereof, and might take action in response to the event message.

In a second aspect of the invention, the system includes a persistent memory (such as NVRAM or other non-volatile memory), in which event messages can be recorded until they are completely handled by the event-distribution engine. Upon recovery from a system crash or other system error, a replay-event producer retrieves those event messages recorded in the persistent memory and not yet completely handled, and re-presents them as event messages for the event-indication queue and the event-distribution engine.

In a third aspect of the invention, the system includes an initialization memory (also called a "system boot memory"), in which event messages can be recorded until the system has completed its operations of initializing and becoming completely prepared to handle event messages. Upon recovery from a system crash or other system error, the replay-event producer retrieves those event messages recorded in the initialization memory and re-presents them as event messages for the event-indication queue and the event-distribution engine.

In a fourth aspect of the invention, a cluster of file servers collectively forming a highly-available system shares persistent memories. Each individual file server writes event messages to both its own and at least one other persistent memory, so that upon a system crash or other system error, at least one other file server has a record of those event messages that were presented by event producers but not yet completely handled by the event-distribution engine. Upon indication of a system crash or other system error by a first file server in the cluster, a second file server in the cluster uses its replay-event producer. Thus, the second file server retrieves those event messages recorded in the persistent memory and not yet completely handled by the first file server, and re-presents them as event messages for its own event-indication queue and event-distribution engine.

In a fifth aspect of the invention, a cluster of event recipients can be coupled to a single multiplexing recipient that includes a second persistent memory in which event messages are recorded after receipt and before being redistributed or otherwise completely handled. Upon recovery from a system crash or other system error by the multiplexing recipient, the multiplexing recipient includes a replay-event producer that retrieves those event messages recorded in the second persistent memory, and re-presents them as event messages as if newly received from an event producer.

The invention provides an enabling technology for a wide variety of applications for persistent and reliable delivery of event messages, so as to obtain substantial advantages and capabilities that are novel and non-obvious in view of the known art. Examples described below primarily relate to reliable file systems, but the invention is broadly applicable to many different types of systems in which persistent and reliable delivery of event messages is desired.

DETAILED DESCRIPTION OF THE PREFERRED EMBODIMENT

Figure 1:
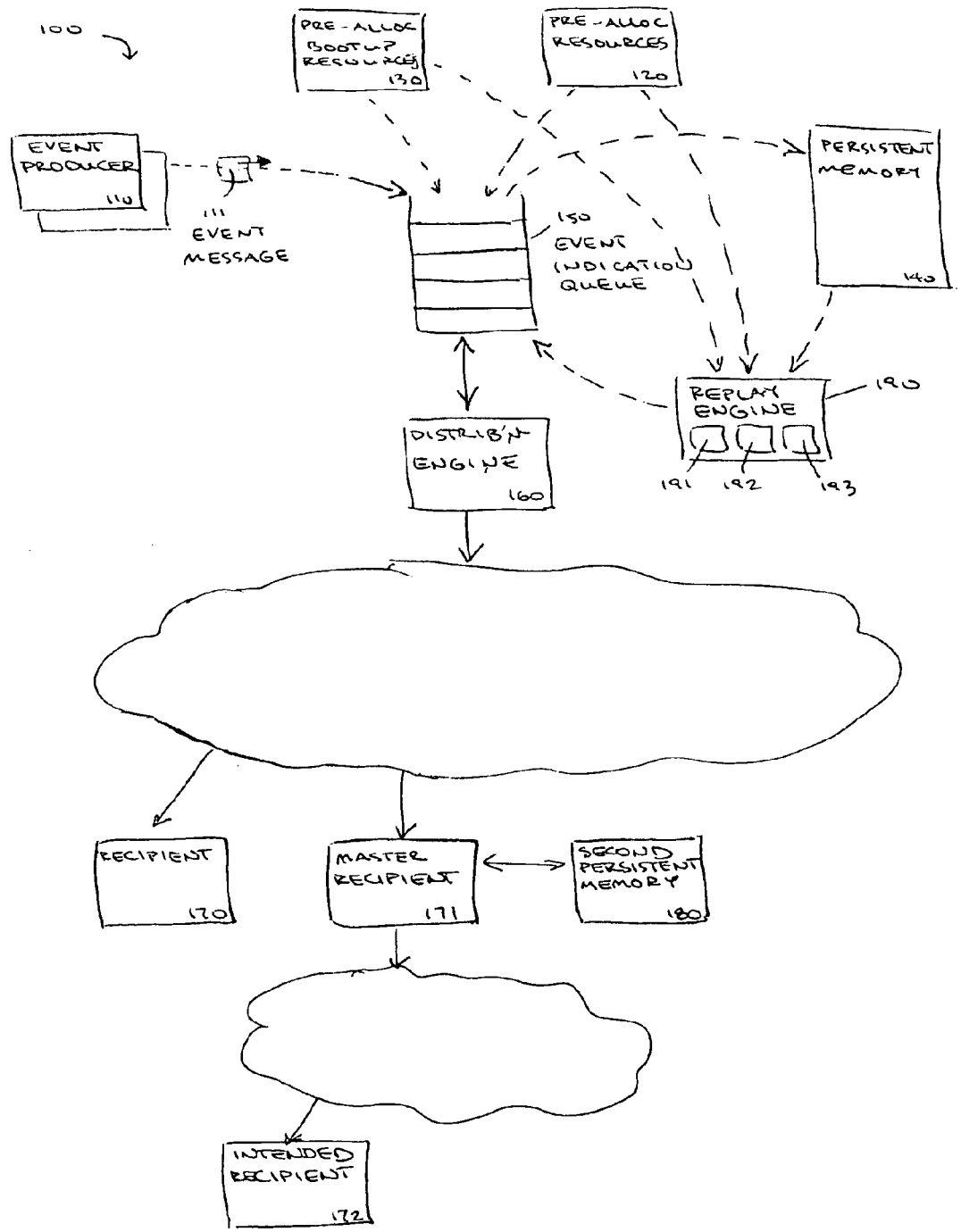
FIG. 1 shows a block diagram of a portion of a system capable of persistent and reliable delivery of event messages.

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Related Applications

Inventions described herein can be used in conjunction with technology described in the following documents.

U.S. patent application Ser. No. 09/642,063, Express Mail Mailing No. EL52478 1089US, filed Aug. 18, 2000, in the name of Blake LEWIS, titled "Reserving File System Blocks"

U.S. patent application Ser. No. 09/642,062, Express Mail Mailing No. EL524780242US, filed Aug. 18, 2000, in the name of Rajesh SUNDARAM, titled "Dynamic Data Storage"

U.S. patent application Ser. No. 09/642,061, Express Mail Mailing No. EL524780239US, filed Aug. 18, 2000, in the name of Blake LEWIS, titled "Instant Snapshot"

U.S. patent application Ser. No. 09/642,065, Express Mail Mailing No. EL524781092US, filed Aug. 18, 2000, in the name of Douglas P. DOUCETTE, titled "Improved Space Allocation in a Write Anywhere File System" and U.S. patent application Ser. No. 09/642,066, Express Mail Mailing No. EL524780256US, filed Aug. 18, 2000, in the name of Ray CHEN, "manipulation of Zombie Files and Evil-Twin Files"

Each of these documents is hereby incorporated by reference as if fully set forth herein. This application claims priority of each of these documents. These documents are collectively referred to as the "Incorporated Disclosures."

Lexicography

The following terms refer or relate to aspects of the invention as described below. The descriptions of general meanings of these terms are not intended to be limiting, only illustrative.

event messages—In general, an event message refers to an alert or notification of a system event, for which an intended recipient of that event message may wish to receive and possibly take action in response to. Examples of event messages include notification of errors, or of events to be logged or otherwise administratively monitored.

event replay—In general, re-presenting event messages (from a memory or other record) by a system element other than the one that generated the original event message. Event messages that are replayed are treated substantially identically to originally generated event messages.

persistent, reliable—In general, persistent refers to memory or another record that is capable of surviving a disruption such as a system crash or a system error. In general, reliable refers to a process that is capable of being performed atomically or otherwise completely even in the event of a disruption such as a system crash or a system error.

pre-allocated resources—general, resources that have been allocated ahead of time for use by a system element (such as for delivery of event messages), so that system element can operate even when disruptions in system operation make it uncertain that resource allocation will be effective at the time when the system element needs those resources.

system crashes, system errors—In general, a system crash or a system error refers to a disruption in system operation sufficiently serious as to place the continuation of system operations (such as delivery of event messages) in doubt. In the description herein, it is assumed that continuation of system operations does not generally survive such disruptions.

system initialization—In general, a time during which a system (such as a file server) is booting or initializing, and so is not necessarily able to perform all necessary operations (such as allocation of resources or delivery of event messages).

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

FIG. 1 shows a block diagram of a portion of a system capable of persistent and reliable delivery of event messages.

A system 100 includes a set of event producers 110, a set of pre-allocated initialization event message resources 120, a set of pre-allocated post-initialization event message resources 130, a persistent memory 140, an event indication queue 150, an event distribution engine 160, a set of event recipients 170 including at least one multiplexing recipient 171 and a set of intended recipients 172, a second persistent memory 180 at the multiplexing recipient 171, and an event replay engine 190.

The event producers 110 include system elements, such as software modules or hardware circuits, each capable of generating at least one event message 111 for delivery to at least one intended recipient 172. In a preferred embodiment, each event message 111 has a standardized format, including information about the time the event was recognized, the system element that recognized the event, the nature of the event, and any detailed information about the event necessary or desirable for the intended recipient 172 to know.

The pre-allocated initialization event message resources 120 include memory, and possibly other resources, for recording and maintaining event messages for further processing. In a preferred embodiment, the pre-allocated initialization event message resources 120 include resources allocated by the system 100 prior to generation of any new event messages 111. In a preferred embodiment, the event messages 111 are recorded in the pre-allocated initialization event message resources 120 before being processed by the event distribution engine 160.

The pre-allocated post-initialization event message resource 130 similar to the pre-allocated initialization event message resources 120, memory, and possibly other resources, for recording and maintaining event messages for further processing. In a preferred embodiment, the pre-allocated post-initialization event message resources 130 include resources allocated by the system 100 during an initialization period and prior to generation of any new event messages 111. In a preferred embodiment, event messages 111 that are generated during the system initialization period are recorded in the preallocated post-initialization event message resources 130. After the system initialization period, event messages 111 recorded therein are processed by the event distribution engine 160.

The persistent memory 140 includes a memory, such as NVRAM, SRAM, or other memory whose contents are expected to survive a system crash or system error. In a preferred embodiment, the persistent memory 140 includes NVRAM also used with the WAFL file system. However, in alternative embodiments, the persistent memory 140 may include any other form of persistent memory, whether NVRAM or not, and whether coordinating with aspects of the WAFL file system or not. Thus, upon recovery from a system crash or system error, the persistent memory 140 will still record those event messages 111 that were not fully processed before the system crash or system error.

The event indication queue 150 includes a memory having a queue of information about event messages 111 (such as the event messages 111 themselves).

The event distribution engine 160 includes a system element capable of reading information about event messages 111 from the event indication queue 50 and capable of delivering at those event messages 111 to intended recipients 172 thereof. In a preferred embodiment, the event distribution engine 160 includes a software module in the system 100.

The event recipients 170 (including at least one multiplexing recipient 171 and a set of intended recipients 172) include system elements, possibly at remote devices such as clients for the file server system 100, capable of receiving event messages 111 and deciding whether or not to act in response to those event messages 111. In a preferred embodiment, actions take with regard to event messages 111 can include alerts or notification of selected users (such as a system operator), logging the event messages 111, or maintaining statistics with regard thereto.

The second persistent memory 180 at the multiplexing recipient 171 includes, similar to the persistent memory 140, a memory, such as NVRAM, SRAM, or other memory whose contents are expected to survive a system crash or system error. The multiplexing recipient 171 includes a recipient replay element 181, capable of reading information about event messages 111 from the second persistent memory 180 and capable of replaying those event messages 111 as if newly received by the multiplexing recipient 171 (thus delivering those event messages 111 to the intended recipients 172).

The event replay engine 190 includes a system element capable of reading information about event messages 111 from the persistent memory 140 and capable of replaying those event messages 111 as if newly generated. The replay element 190 includes a system initialization replay sub-element 191, an incomplete event distribution replay sub-element 192, and a cooperating systems replay sub-element 193.

Method of Operation

Figure 2B:
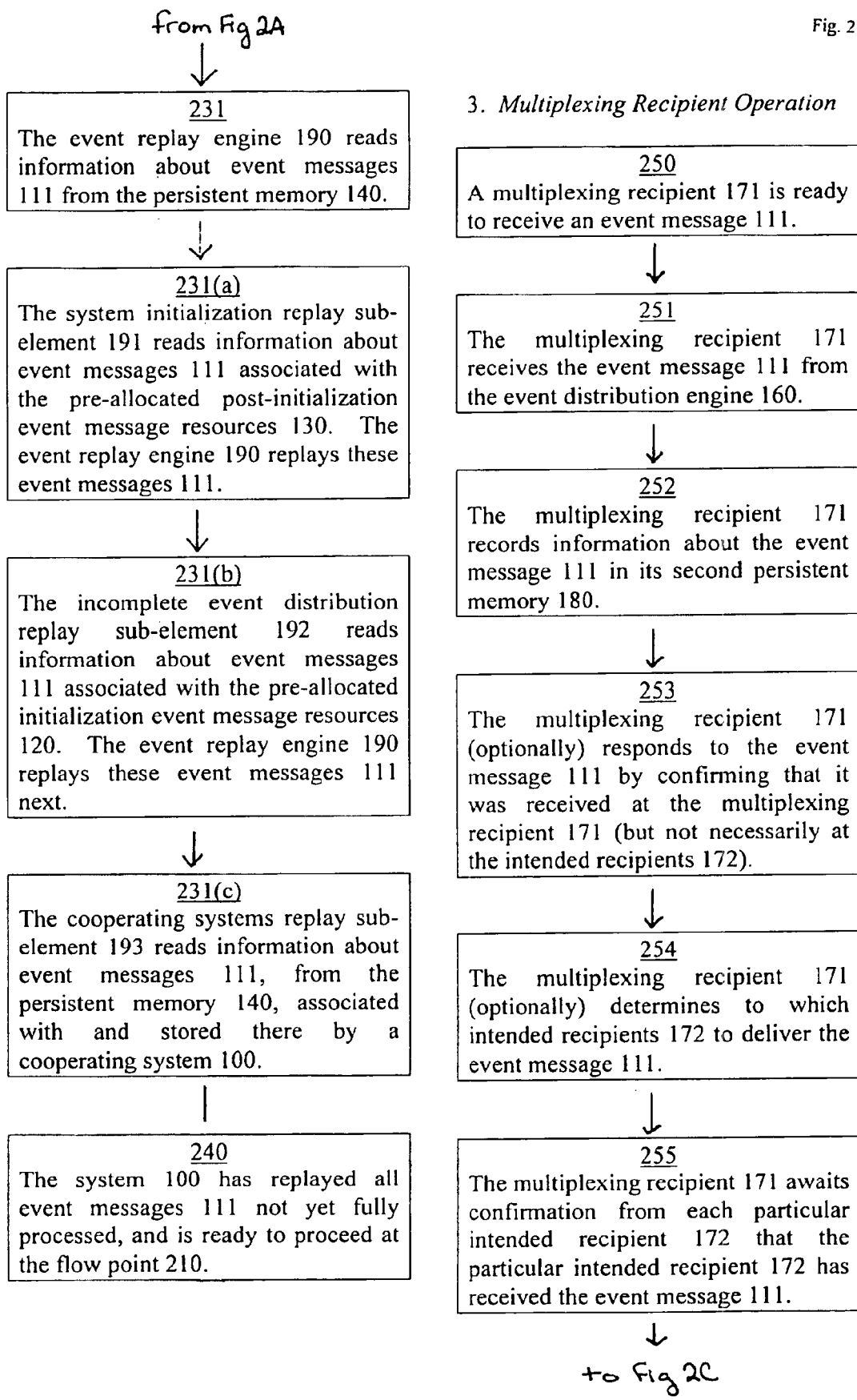
FIG. 2 shows a process flow diagram of a method for operating a system as in FIG. 1.
Figure 2C:
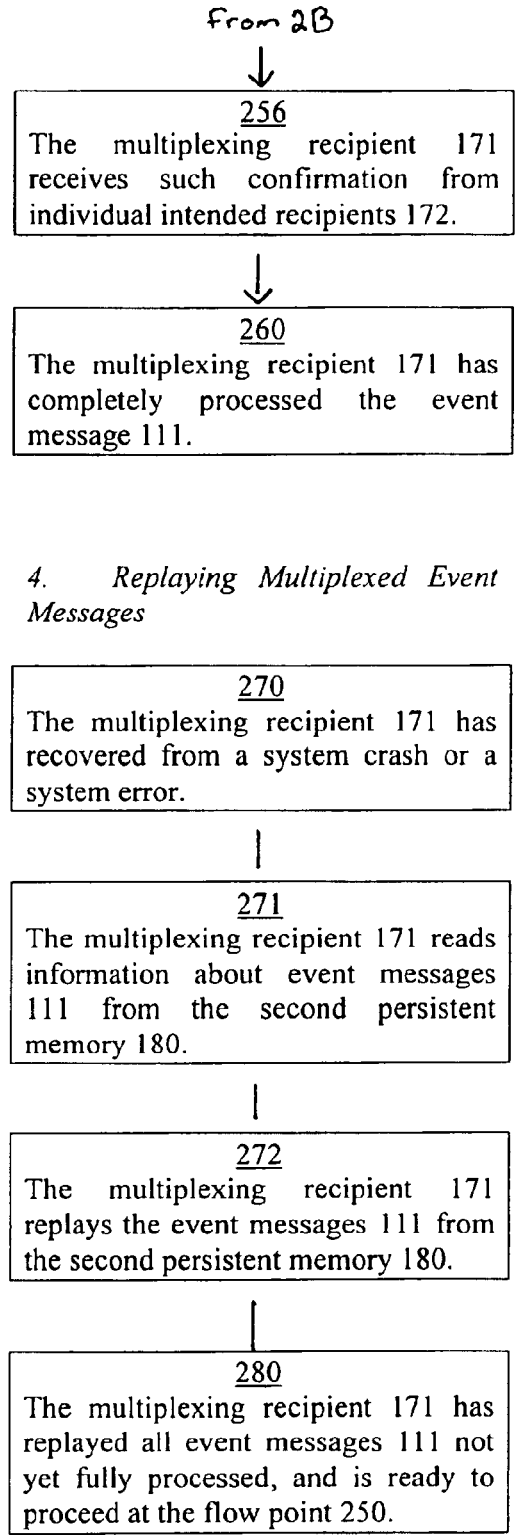
Figure 2C:
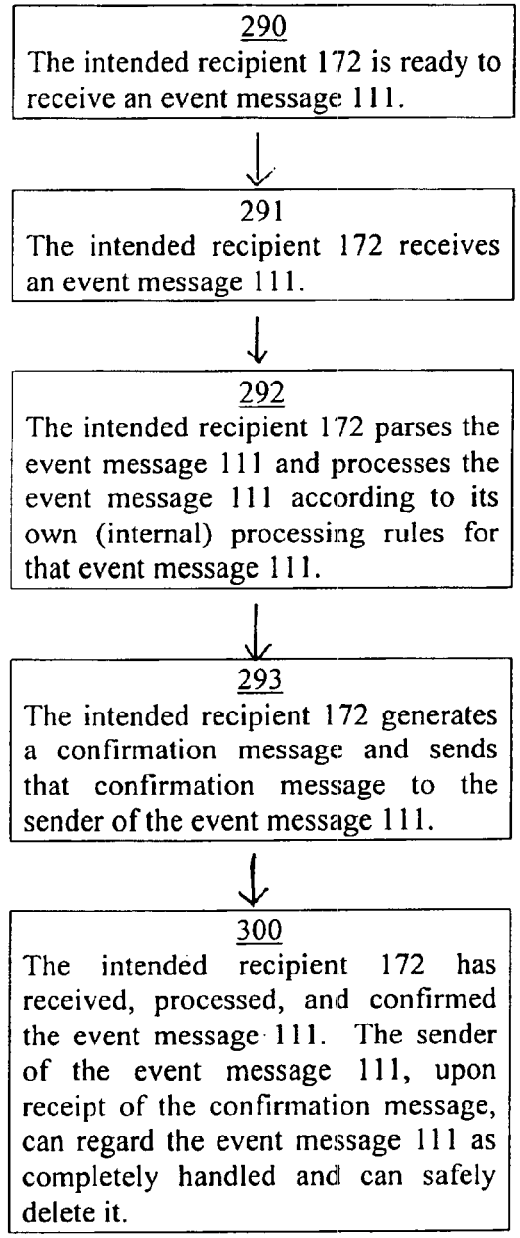

FIG. 2 shows a process flow diagram of a method for operating a system as in FIG. 1.

A method 200 includes a set of flow points and a set of steps. The system 100 performs the method 200. Although the method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

As described below, the method 200 includes a set of processes, each of which has a set of tasks operating independently and asynchronously with regard to each other.

1. Processing Event Messages

A first process in the method 200 is described with regard to a flow point 210, a flow point 220, and steps therebetween. This first process includes a set of three tasks, each of which operates independently and asynchronously with regard to each other.

At the flow point 210, the system 100 is ready to receive an event message 111.

Event Generation

A first task includes a sequence including a step 211, a step 212, a step 213, and a step 214. In a preferred embodiment, the first task in its process includes these steps being performed in sequence and repeatedly.

At the step 211, an event producer 110 generates an event message 111.

At the step 212, if the system 100 is in normal operation, the event message 111 is recorded in the pre-allocated initialization event message resources 120. If the system 100 is still in its initialization time duration, the event message 111 is recorded in the pre-allocated post-initialization event message resources 130.

At the step 213, the system 100 copies information about the event message 111 to a set of locations in the persistent memory 140. In a preferred embodiment, the persistent memory 140 includes a set of memory sections 141, each persistently maintaining system information; at least one of these memory sections 141 maintains information about event messages 111. Other memory sections 141 maintain information about other aspects of the system 100, such as a consistency state of the file system or a set of incomplete file system requests.

In a preferred embodiment, the memory sections 141 associated with event messages 111 maintain information about those event messages 111 in a FIFO having a head pointer and a tail pointer. FIFOs are known in the art of computer data storage. When information about a new event message 111 is recorded in the persistent memory 140, the FIFO is updated to add the information about the new event message 111 to an end of the list. When confirmation is received that the event message 111 was delivered to its intended recipients 172, the FIFO is updated to remove the information about the event message 111.

At the step 214, similar to the step 213, the system 100 copies information about the event message 111 to the event indication queue 150. In a preferred embodiment, the event indication queue 150 includes a FIFO similar to that maintained in the persistent memory 140.

Event Distribution

A second task includes a sequence including a step 215. In a preferred embodiment, the second task in its process includes this step being performed repeatedly.

At the step 215, the event distribution engine 160 responds to the information about the event message 111 in the event indication queue 150. The event distribution engine 160 delivers the event message 111 to its intended recipients 172. As part of this step, each particular intended recipient 172, when it receives the event message 111, responds to the event distribution engine 160 to confirm its receipt of the event message 111.

Event Confirmation

A third task includes a sequence including a step 216 and a step 217. In a preferred embodiment, the third task in its process includes these steps being performed in sequence and repeatedly.

At the step 216, the event distribution engine 160 awaits confirmation from each intended recipient 172 that the event message 111 was received by that particular intended recipient 172. When the event distribution engine 160 receives confirmation from all intended recipients 172, the method proceeds with the next step.

At the step 217, the event distribution engine 160 removes the information about the event message 111 from the event indication queue 150 and from the persistent memory 140.

At the flow point 220, the system 100 has completely processed the event message 111.

2. Replaying Event Messages

At a flow point 230, the system 100 has recovered from a system crash or a system error.

At a step 231, the event replay engine 190 reads information about event messages 111 from the persistent memory 140. As part of this step, the event replay engine 190 performs three sub-steps 231(*a*), 231(*b*), and 231(*c*).

At the sub-step 231(*a*), the system initialization replay sub-element 191 reads information about event messages 111 associated with the pre-allocated post-initialization event message resources 130. The event replay engine 190 replays these event messages 111.

At the sub-step 231(*b*), the incomplete event distribution replay sub-element 192 reads information about event messages 111 associated with the preallocated initialization event message resources 120. The event replay engine 190 replays these event messages 111 next.

At the sub-step 231(*c*), the cooperating systems replay sub-element 193 reads information about event messages 111, from the persistent memory 140, associated with and stored there by a cooperating system 100. The event replay engine 190 replays these event messages 111 only if the cooperating system 100 is not operational at the time.

In a preferred embodiment, multiple cooperating systems 100 (preferably a pair of exactly two) are each capable of reading and writing to each other's persistent memories 140. Thus, when a first cooperating system 100 in the pair writes to its persistent memory 140, the second cooperating system 100 in the pair is able to read from that persistent memory 140. If the first cooperating system 100 suffers a system crash or system error, the second cooperating system 100, upon recognizing that system crash or system error, proceeds to replay the event messages 111 from the first cooperating system's persistent memory 140. Operation of multiple cooperating systems 100 is further described in the Incorporated Disclosures, particularly with regard to techniques used to prevent multiple cooperating systems 100 from disrupting each other's operation.

As noted herein, "replay" of event messages 111 is treated by the event indication queue 150 and the event distribution engine 160 as if the event messages 111 were newly generated. Replayed event messages 111 are processed and delivered before new event messages 111, according to the portion of the method 200 described with regard to flow point 210 and flow point 220.

At a flow point 240, the system 100 has replayed all event messages 111 not yet filly processed, and is ready to proceed at the flow point 210.

3. Multiplexing Recipient Operation

A third process in the method 200 is described with regard to a flow point 250, a flow point 260, and steps therebetween. Similar to the first process, this third process includes a set of three tasks, each of which operates independently and asynchronously with regard to each other.

At the flow point 250, a multiplexing recipient 171 is ready to receive an event message 111.

Event Reception

A first task includes a sequence including a step 251, a step 252, and a step 253. In a preferred embodiment, this first task in its process includes these steps being performed in sequence and repeatedly.

At the step 251, the multiplexing recipient 171 receives the event message 111 from the event distribution engine 160.

At the step 252, similarly to the steps described with regard to the flow point 210 and the flow point 220, the multiplexing recipient 171 records information about the event message 111 in its second persistent memory 180.

At the step 253, the multiplexing recipient 171 (optionally) responds to the event message 111 by confirming that it was received at the multiplexing recipient 171 (but not necessarily at the intended recipients 172).

Event Multiplexing

A second task includes a sequence including a step 254. In a preferred embodiment, this second task in its process includes this step being performed repeatedly.

At the step 254, the multiplexing recipient 171 (optionally) determines to which intended recipients 172 to deliver the event message 111. In a preferred embodiment, the multiplexing recipient 171 filters the event messages 111 it receives, so that it delivers only those event messages 111 it receives to their actual intended recipients 172. For example, a particular intended recipient 172 might determine that it is only interested in a particular subclass of event messages 111. In such cases, the multiplexing recipient 171 delivers only that particular subclass of event messages 111 to that particular intended recipient 172.

Event Confirmation

A third task includes a sequence including a step 255 and a step 256. In a preferred embodiment, this third task in its process includes these steps being performed in sequence and repeatedly.

At the step 255, the multiplexing recipient 171 awaits confirmation from each particular intended recipient 172 that the particular intended recipient 172 has received the event message 111.

At the step 256, the multiplexing recipient 171 receives such confirmation from individual intended recipients 172. As part of this step, the multiplexing recipient 171 (optionally) forwards those confirmations on to the event distribution engine 160. When the multiplexing recipient 171 receives all such confirmations, it removes the information about the event message 111 from the second persistent memory 180.

At the flow point 260, the multiplexing recipient 171 has completely processed the event message 111.

4. Replaying Multiplexed Event Messages

At a flow point 270, the multiplexing recipient 171 has recovered from a system crash or a system error.

At a step 271, the multiplexing recipient 171 reads information about event messages 111 from the second persistent memory 180.

At a step 272, the multiplexing recipient 171 replays the event messages 111 from the second persistent memory 180.

"Replay" of event messages 111 by the multiplexing recipient 171 is similar to replay of event messages as described above with regard to the event indication queue 150 and the event distribution engine 160.

At a flow point 280, the multiplexing recipient 171 has replayed all event messages 111 not yet fully processed, and is ready to proceed at the flow point 250.

5. Confirming Event Messages

As described above, there are steps at which the system 100 or the multiplexing recipient 171 awaits confirmation of the event message 111 from the intended recipient 172. In a preferred embodiment, confirmation of event messages 111 is performed by each intended recipient 172 as described below with regard to a flow point 290, a flow point 300, and steps there-between.

At the flow point 290, the intended recipient 172 is ready to receive an event message 111.

At a step 291, the intended recipient 172 receives an event message 111.

At a step 292, the intended recipient 172 parses the event message 111 and processes the event message 111 according to its own (internal) processing rules for that event message 111.

At a step 293, the intended recipient 172 generates a confirmation message and sends that confirmation message to the sender of the event message 111.

At the flow point 300, the intended recipient 172 has received, processed, and confirmed the event message 111. The sender of the event message 111, upon receipt of the confirmation message, can regard the event message 111 as completely handled and can safely delete it.

Generality of the Invention

The invention has general applicability to various fields of use, not necessarily related to the services described above. For example, these fields of use can include one or more of, or some combination of, the following:

The invention is applicable to persistent and reliable delivery of messages other than event messages.

The invention is applicable to persistent and reliable operation of other processes than delivery of messages.

The invention is applicable to mutually cooperating systems to perform other persistent and reliable operations.

The invention is applicable to hierarchical cooperating systems to perform other persistent and reliable operations.

Other and further applications of the invention in its most general form, will be clear to those skilled in the art after perusal of this application, and are within the scope and spirit of the invention.

Although preferred embodiments are disclosed herein, many variations are possible which remain within the concept, scope, and spirit of the invention, and these variations would become clear to those skilled in the art after perusal of this application.

What is claimed is:

1. A method of a system handling an event message, comprising:
   producing at least one event message;
   storing said event message in a persistent memory in said system until said event message is handled; and
   deleting said event message from said persistent memory after said event message is handled by said system;
   wherein when said system is recovering from a system crash or error, said persistent memory is an initialization memory where said message is stored until said system recovers from said system crash or error.

2. A method as in claim 1, wherein said event message indicates an occurrence of a special event for said system.

3. A method as in claim 2, wherein said special event is said system crash or error.

4. A method as in claim 1, further comprising the step of handling said event message by delivering said event message to an intended recipient.

5. A method as in claim 4, wherein said event message is delivered to said intended recipient through a multiplexing recipient.

6. A method as in claim 5, wherein said multiplexing recipient further performs the steps of:
   storing said event message in said multiplexing recipient's persistent memory until said event message is handled by said multiplexing recipient; and
   deleting said event message from said multiplexing recipient's persistent memory after said event message is handled by said multiplexing recipient.

7. A method as in claim 4, wherein said intended recipient sends a confirmation to said system after delivery of said event message to said intended recipient.

8. A method as in claim 1, wherein storing said event message in said persistent memory further comprises storing said event message in an event indication queue, said event indication queue having resources pre-allocated before occurrence of an event associated with said event message.

9. A method as in claim 8, wherein said event indication queue is reliable even when said event message indicates that allocation of new resources is unstable.

10. A system comprising:
    an event message producer;
    a persistent memory in which at least one event message from said event message producer is stored until said system handles said event message; and
    an event message distributor that handles said event message;
    wherein said event message is deleted from said persistent memory after said event message is handled by said system; and
    wherein when said system is recovering from a system crash or error, said persistent memory is an initialization memory where said message is stored until said system recovers from said system crash or error.

11. A system as in claim 10, wherein said event message indicates an occurrence of a special event for said system.

12. A system as in claim 11, wherein said special event is said system crash or error.

13. A system as in claim 10, wherein said event message distributor delivers said event message to an intended recipient.

14. A system as in claim 13, wherein said event message is delivered to said intended recipient through a multiplexing recipient.

15. A system as in claim 14, wherein said multiplexing recipient performs the steps of:
    storing said event message in said multiplexing recipient's persistent memory until said event message is handled by said multiplexing recipient; and
    deleting said event message from said multiplexing recipient's persistent memory after said event message is handled by said multiplexing recipient.

16. A system as in claim 13, wherein said intended recipient sends a confirmation to said system after delivery of said event message to said intended recipient.

17. A system as in claim 10, wherein said persistent memory further comprises an event indication queue, said event indication queue having resources pre-allocated before occurrence of an event associated with said event message.

18. A system as in claim 17, wherein said event indication queue is reliable even when said event message indicates that allocation of new resources is unstable.

19. A memory storing instructions executable by a system, said instructions comprising:
    producing at least one event message;
    storing said event message in a persistent memory in said system until said event message is handled; and
    deleting said event message from said persistent memory after said event message is handled by said system;
    wherein when said system is recovering from a system crash or error, said persistent memory is an initialization memory where said message is stored until said system recovers from said system crash or error.

20. A memory as in claim 19, wherein said event message indicates an occurrence of a special event for said system.

21. A memory as in claim 20, wherein said special event is said system crash or error.

22. A memory as in claim 19, wherein said instructions further capable of being interpreted to indicate handling said event message by delivering said event message to an intended recipient.

23. A memory as in claim 22, wherein said event message is delivered to said intended recipient through a multiplexing recipient.

24. A memory as in claim 23, wherein said multiplexing recipient further performs the steps of:
   storing said event message in said multiplexing recipient's persistent memory until said event message is handled by said multiplexing recipient; and
   deleting said event message from said multiplexing recipient's persistent memory after said event message is handled by said multiplexing recipient.

25. A memory as in claim 22, wherein said intended recipient sends a confirmation to said system after delivery of said event message to said intended recipient.

26. A memory as in claim 19, wherein storing said event message in said persistent memory further comprises storing said event message in an event indication queue, said event indication queue having resources pre-allocated before occurrence of an event associated with said event message.

27. A memory as in claims 26, wherein said event indication queue is sage indicates that allocation of new resources is unstable.

* * * * *